April 2, 1963  F. A. WETTSTEIN  3,083,983
LEVELLING SYSTEM FOR VEHICLES EQUIPPED WITH SERVO SPRINGS
Filed May 9, 1960
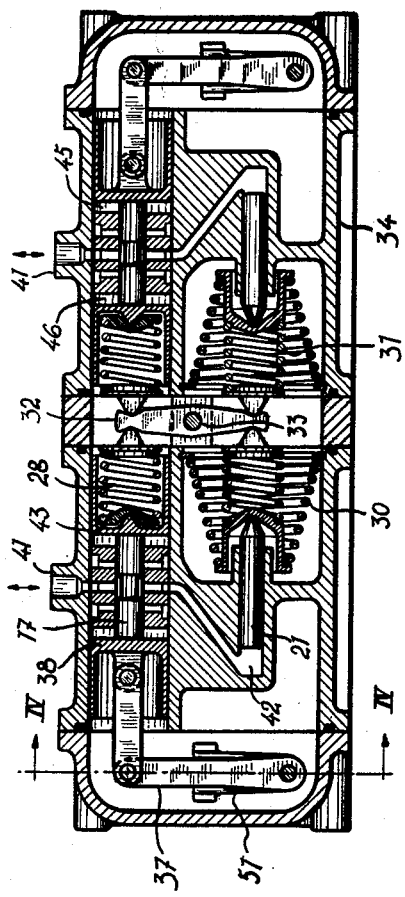

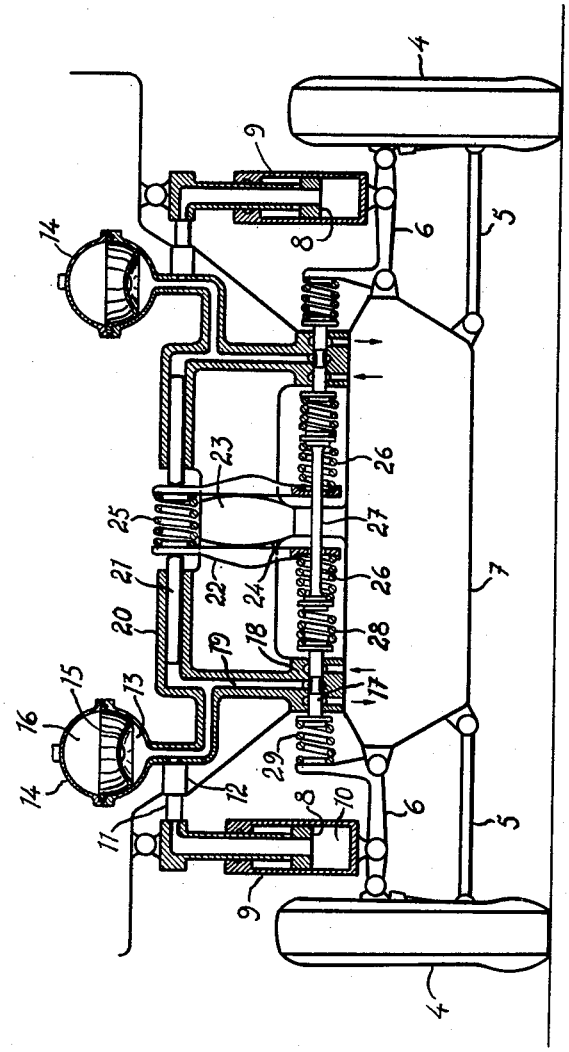

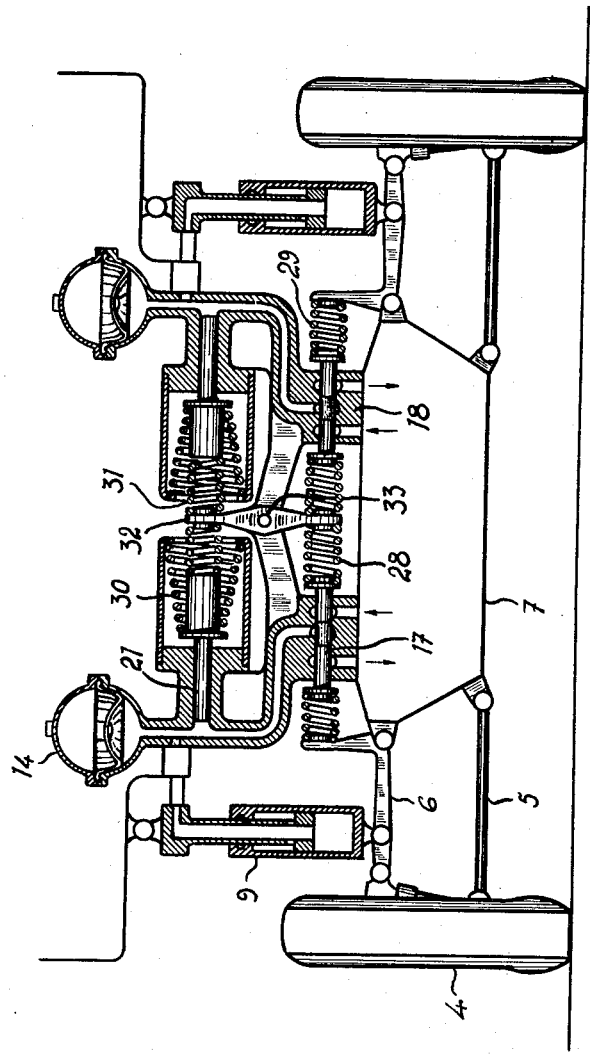

United States Patent Office 3,083,983
Patented Apr. 2, 1963

3,083,983
LEVELLING SYSTEM FOR VEHICLES EQUIPPED WITH SERVO SPRINGS
Fritz A. Wettstein, Goteborg S, Sweden, assignor to Aktiebolaget Volvo, Goteborg, Sweden, a corporation of Sweden
Filed May 9, 1960, Ser. No. 27,872
Claims priority, application Sweden May 13, 1959
4 Claims. (Cl. 280—124)

This invention relates to a levelling system for vehicles equipped with servo springs.

It is known to equip vehicles with servo springs of mechanical, pneumatic or hydropneumatic type and with a levelling system which is adapted, by means of the servo force, to maintain constant the distance between the sprung parts and the unsprung parts of the vehicle. Such systems have the advantage that it is possible to have a soft and effective spring action even in vehicles subjected to relatively great load variations without the mean level of the vehicle being influenced by the load. However, hitherto known levelling systems for vehicles in which all of the four wheels have individual levelling devices have the disadvantage that when the vehicle stands on an uneven ground and the levelling devices tend to bring about equal distances between all four wheels and the sprung part of the vehicle, the outcome is that the weight of the vehicle will rest substantially on two diagonally opposite vehicle springs and vehicle wheels. After the start of such a vehicle the uneven distribution of weight will be eventually corrected, but up to that time the uneven weight distribution is a serious disadvantage as regards the stresses on the vehicle and the riding characteristics and safety. Another disadvantage in known types of levelling systems is due to the fact that if a vehicle takes a bend the levelling system will effect a certain loading of the outer servo springs and a certain unloading of the inner servo springs. If the vehicle thereupon runs straight ahead or takes an opposite bend, the sprung part of the vehicle will assume an inclined position which also has an unfavourable effect on the riding characteristics.

The object of this invention is to avoid the above inconvenience by means of a levelling system which also on an uneven ground loads the servo springs of the vehicle to such a height and load that when the evenly loaded vehicle is moved again to an even horizontal road, the servo springs on all wheels will immediately obtain equal length and be subjected to equal load. This also means that if a vehicle equipped with a levelling system according to the invention is moved from an even to an irregular ground or from a straight road into a bend, there will be no level control action. This object is attained, in accordance with the invention, by the fact that each valve device is adapted to be actuated by two impulse members, one of said impulse members being a levelling device adapted to be actuated by the distance between the sprung part and the unsprung part of the vehicle, whereas the other impulse member is a pressure member adapted to be actuated by the ratio of the spring forces on both sides of the vehicle. The last-named impulse member is adjusted such that in case of a roll movement of an axle it will counteract the impulse forces from the first impulse member, the result being that the levelling system will begin to function only if the mean clearance height of an axle differs from its normal value, whereas there is no levelling action in case of a pure roll movement.

Further objects and advantages of the invention will appear from the following description with reference to the annexed drawing. FIGS. 1 and 2 are diagrammatic illustrations, partly in section, of front vehicle axles embodying two different constructions of the levelling system according to the invention. FIG. 3 is a longitudinal section of a levelling device according to the invention, FIG. 4 a sectional view along the line IV—IV in FIG. 3, FIG. 5 a section of a control valve in FIG. 3, and FIG. 6 a sectional view along the line VI—VI in FIG. 5 on an enlarged scale.

FIG. 1 is an embodiment of the invention shown as mounted on a vehicle axle with independent suspension. For the sake of clearness, the control device is shown on a larger scale than the other parts of the axle. The vehicle wheels 4 or unsprung parts are by means of reaction arms 5 and 6 movably connected with the frame 7 or the sprung part of the vehicle. Movably interconnected between the reaction arms 6 and the frame 7 are telescopic elements, each consisting of a differential piston 8 and a differential cylinder 9. The space 10 in the differential cylinder 9 is filled with a hydraulic liquid and communicates through the hollow differential piston 8, a flexible conduit 11 and a damping device 12 with the liquid space 13 in a pressure container 14. A resilient diaphragm 15 in the pressure container 14 separates the liquid space 13 from a space 16 which is filled with a compressed gas.

The levelling device which consists of a slide valve 17 in a valve casing 18 firmly mounted on the frame 7 controls the supply and discharge of liquid under pressure through a conduit 19 which communicates with the liquid space 13 in the pressure container 14. The conduit 19 also communicates with a cylinder 20 having a piston 21 which contacts a lever 22. The lever 22 abuts turnably against a support 23 having a curved face 24. The upper end of the lever carries a balancing spring 25 and the lower end carries springs 26 having a movable spring support 27. A spring 28 is inserted between the movable spring support 27 and the slide valve 17, and a spring 29 is inserted between the slide valve 17 and the reaction arm 6.

The mode of operation of the hydropneumatic suspension and levelling system according to FIG. 1 is as follows. Assuming, to begin with, an increase of load which is equally distributed between both wheels of the axle, this increase in load results in an upward springing movement of both wheels 4 relative to the sprung part 7 of the vehicle. As a result, part of the liquid in the spaces 10 of the cylinders 9 will be forced into the liquid spaces 13 of the pressure container 14 so as to compress the gas in the spaces 16 until the increased spring forces counterbalance the increased load on the vehicle. At the same time as the wheels 4 move upwards the reaction arms 6 compress the springs 29 with the result that the slide valves 17 open the supply conduits for pressure fluid to the conduits 19. The supply of pressure fluid to the conduits 19 and the spaces 10 in the telescopic elements continues until the normal level of the vehicle is reestablished, or in more exact words, until the normal vertical distance between the unsprung part 4 and the sprung part 7 of the vehicle is reestablished. The increase of pressure in the spring system and conduits 19 causes a certain compression of the balancing spring 25, a certain inclination of the levers 22 and a certain compression of the springs 26. These movements have obviously no effect on the slide valves 17. Consequently, in case of a symmetric variation of load the levelling control 17 is acted upon solely by the levelling impulses through the springs 29.

If now a pure roll movement of the vehicle is assumed, for instance in such a manner that the left-hand wheel 4 is raised and the right-hand wheel 4 is lowered by an equal amount relative to the sprung part 7 of the vehicle, this will result partly in a compression of the left-hand spring 29 and an extension of the right-hand spring 29 and partly in a pressure increase in the left pressure container 14 and a pressure drop in the right pressure container 14. By means of the pistons 21 and levers 22, these pressure variations cause a displacement of the spring support 27 to the left, resulting in a compression of the left spring 28 and an extension of the right spring 28. If the size of the pistons 21, the ratio at the levers 22 and the rates of the springs 25 and 26 are suitably chosen, it is possible to obtain balance between the left-hand springs 28 and 29 so that the left-hand slide valve 17 will not be actuated by a pure roll movement. The same holds true of the right-hand slide valve 17 where the right-hand springs 28 and 29 balance each other. Consequently, the levelling system is not actuated by a pure roll movement of a vehicle axle relative to the sprung part of the vehicle, irrespective of whether the inclination of the axle is due to the fact that the vehicle goes through a bend or is travelling on a sloping road or is parked on uneven ground, in which case both axles are inclined relative each other. If the vehicle then returns to an even or straight road, the springs will immediately reassume their normal intermediate positions, the levelling system having not produced any change.

The arrangement of the levers 22 on the curved faces 24 serves the purpose of compensating the levelling control for different loads on the vehicle. As a matter of fact, a certain springing movement of the wheels 4 always results in the same change of length of the spring 29. However, the same springing movement causes, for instance, twice as great a change of the absolute pressure in the pressure container 14 if the sprung weight of the vehicle has become twice as great. If the ratio at the levers 22 were constant, the compensation for roll movement obtained by the levelling system through the pistons 21 would become too great for the increased load. This is prevented by the fact that the ratio at the levers 22 varies with varying load on the vehicle. If the load on the vehicle is increased, the pressure increases in both spring systems and both conduits 19, resulting in that the springs 25 and 26 will be compressed by the pistons 21. In this case, the levers 22 will assume a different mutual position and make an acute angle with each other such that the points of contact between the levers 22 and the support 23 will move to a higher position. If the curved faces 24 of the support 23 are suitably shaped it can be assured that, for instance, a duplication of the sprung weight of the vehicle will result in a duplication of the ratio at the levers 22. Consequently, in case of a pure roll movement the springs 28 and 29 will always balance each other irrespective of the load on the vehicle.

The compensation of the levelling system for varying loads on the vehicle can also be achieved by the construction shown in FIG. 2. The arrangement of the hydropneumatic springs and part of the levelling system are the same as in FIG. 1. However, the pistons 21 act partly on progressive springs 30 which at one end are mounted in the sprung part of the vehicle, and partly through springs 31 on a lever 32 which is pivoted on a stationary fulcrum 33 and at its other end abuts against the springs 28 which in a manner similar to that shown in FIG. 1 act upon the slide valves 17.

The mode of operation of the embodiment shown in FIG. 2 is substantially the same as described with reference to FIG. 1. However, compensation for varying loads is effected in a manner such that upon increase of load on the vehicle and increased pressure in the spring system the pistons 21 will effect a certain compression of the springs 30 and 31. The springs 30 are conical and dimensioned such that upon increasing load more and more of the coils, starting from the large diameter ends of the springs, will come into contact with each other. In this way there is obtained a progressive spring rate of the springs 30, and the higher the load, the stiffer become the springs. If the springs 30 and 31 are suitably dimensioned it is possible, due to the progressivity of the springs 30, that during a roll movement with consequent pressure difference between the left-hand and right-hand spring systems the springs 28 are always acted upon equally by the same ratio of the spring pressures. Since a certain roll movement of the vehicle always causes the same pressure ratio between the left-hand and right-hand spring systems irrespective of the load on the vehicle, the springs 28 and 29 will always be counterbalanced in case of a roll movement, and the slide valves 17 will therefore not begin to function in the event of a pure roll movement. Consequently, the levelling control will operate only when the mean level of a vehicle axle differs from its normal value.

Summing up, it can be said that in both embodiments according to FIGS. 1 and 2 the level and the pressure of the springs are individually controlled by separate control members or slide valves 17, each control member being actuated by two impulse members, namely, a levelling device consisting of the reaction arm 6 and the spring 29, and a pressure member consisting of the piston 21 and spring 28 and the intermediate transmission mechanism. The levelling impulses tend to maintain constant the mean distance between the sprung part of the vehicle and the unsprung parts of an axle, and the pressure impulse tends in each position of the axle to bring about such a distribution of pressure between both springs of an axle that the spring forces become equal as soon as the distances between the sprung part of the vehicle and the unsprung parts of the axle change from a non-symmetrical to a symmetrical relation. A vehicle equipped with servo springs and servo control members according to the invention will, in case of a pure roll movement of an axle, behave like a vehicle equipped with conventional springs. This is due to the fact that the control members for the servo springs do not become operative in case of a pure roll movement but only if the mean distance between the sprung part and the unsprung part of the vehicle changes.

FIGS. 3, 4, 5 and 6 illustrate in detail an embodiment of the invention for the hydropneumatic system according to FIG. 2. All control members belonging to a vehicle axle are enclosed in a common casing 34 which is firmly mounted in the sprung part of the vehicle. The lever 35 shown in FIG. 4 is connected with the unsprung part of the vehicle and transmits the relative movement between the sprung and unsprung parts by means of a torsion bar spring 36 and a lever 37 to a piston 38 in the casing 34. A connection 39 of the casing 34 communicates with the high-pressure side of the hydraulic system, and another connection 40 communicates with the low-pressure side or return conduit of the hydraulic system. Pipe connections 41 communicate with the liquid space 13 of the fluid springs of the vehicle on either side of the vehicle and also with a cylinder space 42 for the piston 21. The pressure on the piston 21 is transmitted partly by the progressive spring 30 to the casing 34 and partly by the spring 31 to the lever 32 which by means of the pivot 33 is mounted for turning movement in the casing 34. The other end of the lever 32 acts by means of the spring 28 on a piston 43 in the casing 34. The slide valve 17 is inserted between and actuated by the pistons 38 and 43. The slide valve 17 is movable in the valve casing 44 which is rigidly connected with the casing 34. Formed between the casing 44 and the pistons 38 and 43 are chambers 45 and 46, respectively, which communicate with the return conduit 40 through separate restriction devices 47. FIG. 6 is a cross-sectional view of a restriction device 47 which consists of a spring-loaded non-return valve 48 and a slotted washer 49 provided between the non-return valve 48 and the seat of this valve.

The mode of operation of the levelling system according to FIGS. 3, 4, 5 and 6 is substantially the same as in the embodiment according to FIG. 2. The function of the spring 29 in FIG. 2 is performed by the torsion bar spring 36 in FIGS. 3 and 4. Consequently, the levelling impulses for both springs of a vehicle axle are transmitted to the slide valves 17 by means of the levers 35, torsion bar springs 36 and levers 37, and the pressure impulses are also transmitted to the slide valves 17 from the pistons 21 by means of the springs 31, the lever 32 and the springs 28. The various parts are dimensioned such that in case of a pure roll movement of the vehicle axle the levelling impulses and the pressure impulses will balance each other so that the slide valves 17 will remain in their neutral intermediate positions. Consequently, loading of the servo springs is not affected by a pure roll movement. Only if the mean distance between the sprung part of the vehicle and the unsprung parts of the axle varies, the levelling system becomes operative to reestablish the normal distance.

The pistons 38 and 43 together with the restriction devices 47 serve as a delaying device for the levelling impulses and pressure impulses. To this end, the slide valves 17 somewhat overlap their supply and discharge ducts. If a suitable lag is chosen, the levelling system will not be affected by the normal springing movements of the vehicle, but substantially only by load variations.

The vehicle clearance height determined by the fluid springs can be manually adjusted by means of a lever 50 rigidly connected with a lever 51 which has two abutments for contacting the lever 37. In this way the levelling impulses can be overcome in order to raise or lower the sprung part of the vehicle, for instance in case of tire changing, repairs or the like.

What I claim is:
1. A levelling system for vehicles comprising fluid actuated servo springs arranged between the sprung and unsprung parts of the vehicle, valves arranged to control the flow of pressure fluid to and from said servo springs, first spring members arranged between the said valves and the unsprung parts of the vehicle, a movable spring support responsive to the pressures in servo springs on opposite sides of the vehicle, second spring members arranged between said valves and said spring support, two impulse members actuated by the pressure in two servo springs on opposite sides of the vehicle, a third spring member and two levers arranged to be actuated by said impulse members, said levers abutting against a curved support and fourth spring members arranged to be actuated by said levers and resting against said movable spring support.

2. A levelling system for vehicles comprising fluid actuated servo springs arranged between the sprung and unsprung parts of the vehicle, valves arranged to control the flow of pressure fluid to and from said servo springs, first spring members arranged between said valves and the unsprung parts of the vehicle, a movable spring support responsive to the pressures in servo springs on opposite sides of the vehicle, second spring members arranged between said valves and said movable support, two impulse members actuated by the pressure in two servo springs on opposite sides of the vehicle, third spring members arranged between said impulse members and said movable support, and two progressive rate springs arranged between said impulse members and a fixed support.

3. A levelling system for a vehicle having a sprung part and an unsprung part comprising fluid actuated servo springs arranged between the sprung and unsprung parts of the vehicle, valve devices for controlling the flow of pressure fluid to and from said servo springs, a first impulse member responsive to the distance between the sprung and unsprung parts of the vehicle and a second impulse member responsive to the pressure differential in servo springs on opposite sides of the vehicle, said first and second impulse members being arranged to actuate said valve devices and substantially to balance each other for equal and opposite movements of said servo springs on opposite sides of the vehicle.

4. A levelling system for a vehicle having a sprung part and an unsprung part comprising fluid actuated servo springs arranged between the sprung and unsprung parts of the vehicle, pressure responsive means acted upon by the pressure differential in servo springs on opposite sides of the vehicle, valve devices arranged on the sprung part of the vehicle for controlling the flow of pressure fluid to and from said servo springs, first springs arranged between said valve devices and the unsprung part of the vehicle and second springs arranged between said valve devices and said pressure responsive means, said springs and said pressure responsive means balancing each other for equal and opposite movements of said servo springs on opposite sides of the vehicle.

References Cited in the file of this patent
UNITED STATES PATENTS

| | | |
|---|---|---|
| 1,816,075 | Down | July 28, 1931 |
| 2,849,225 | Lucien | Aug. 26, 1958 |
| 2,864,454 | La Belle | Dec. 16, 1958 |
| 2,895,745 | Brueder | July 21, 1959 |